May 5, 1970   A. J. FAILS   3,510,027
DRIPLESS POURER FOR SYRUP OR THE LIKE
Filed Jan. 25, 1968   2 Sheets-Sheet 1
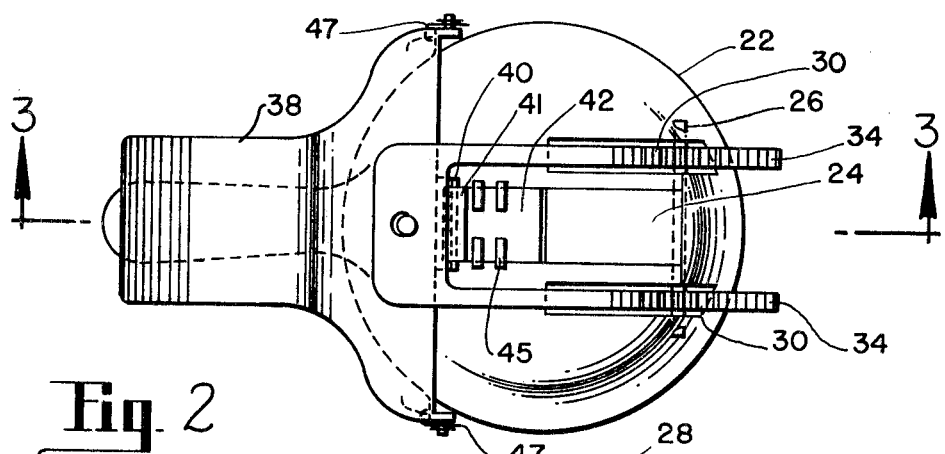
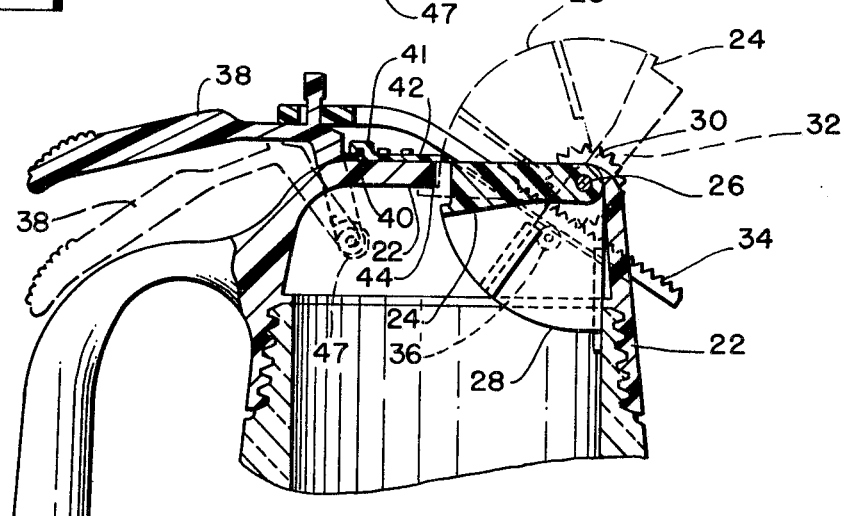
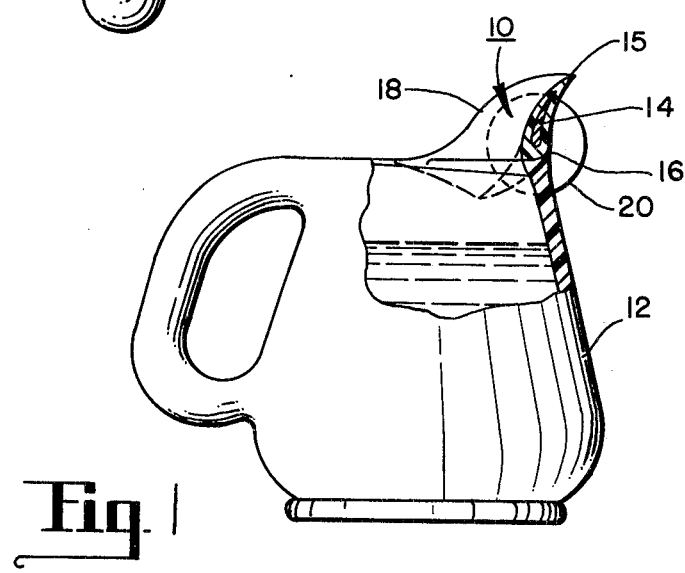
ANNA J. FAILS
*INVENTOR.*

May 5, 1970 A. J. FAILS 3,510,027
DRIPLESS POURER FOR SYRUP OR THE LIKE
Filed Jan. 25, 1968 2 Sheets-Sheet 2
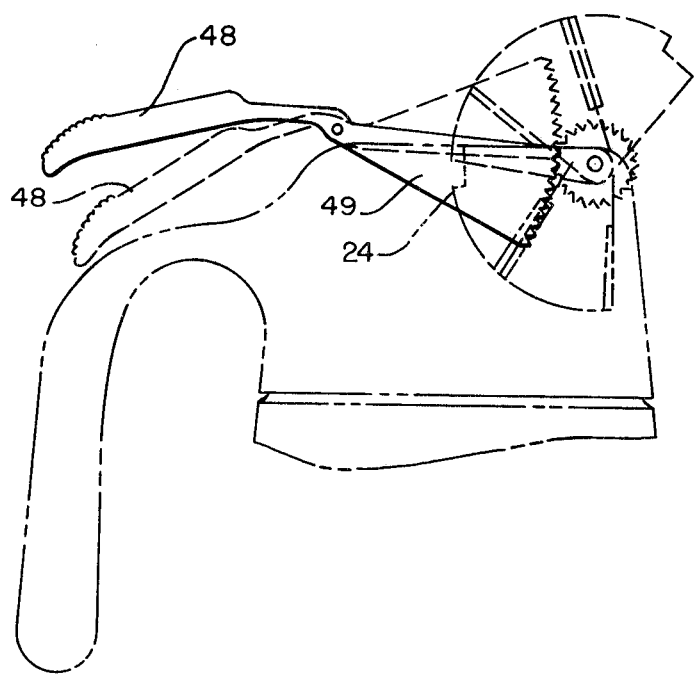
Fig. 4
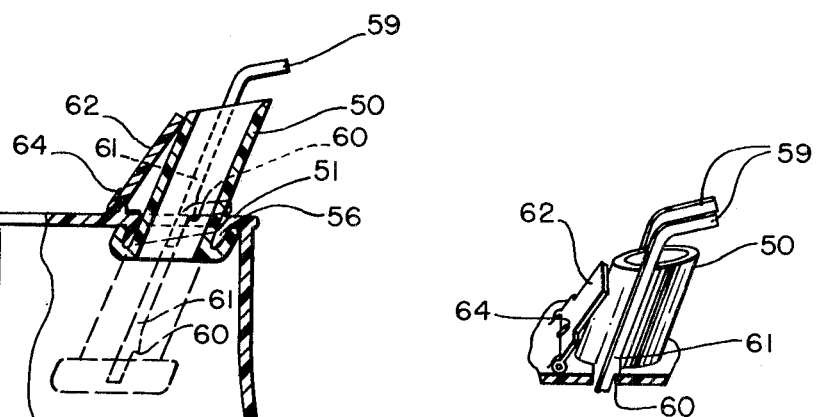
Fig. 5
Fig. 6
ANNA J. FAILS
INVENTOR.

3,510,027
DRIPLESS POURER FOR SYRUP OR THE LIKE
Anna J. Fails, Richardson, Tex.
(3729 Ashford Ave., Fort Worth Tex. 76133)
Filed Jan. 25, 1968, Ser. No. 700,501
Int. Cl. B67d *1/16*
U.S. Cl. 222—109                                   5 Claims

ABSTRACT OF THE DISCLOSURE

A pourer that can be affixed to a container or made an integral part of the container characterized by having a spout inclined within the container but movable to a pouring position outside the container.

ABSTRACT OF THE DISCLOSURE

This invention relates to a pourer for syrup or the like.

Many containers, closures and spouts have been designed for pouring syrup, honey, and other such liquids. Such spouts have terminated in raised portions, they have terminated in depressions, and they have had movable appendages to cut off the flow of the liquid. Despite these attempts, the problem of dripping of the liquid onto the outside of the container has continued to plague the user. The outside dripping has been a particular problem with liquids containing sugars because of the sticky residue and the attraction for insects and bacterial growth.

SUMMARY OF THE INVENTION

In accordance with the invention, there is provided a pourer, for pouring a liquid from a container, comprising a liquid impermeable supporting structure, a spout normally reposing at an angle above the liquid and positioned so that any of the liquid on the spout will drip within the container, but movable to a pouring position with one end outside the container, and the other end contiguous with the container forming a liquid impermeable path to the spout, positioning means holding the spout in the normal reposing position and operable to move the spout to the pouring position.

BRIEF DESCRIPTION OF THE DRAWINGS

FIG. 1 is an elevational view, partly in section, of a simple embodiment of the invention in which the pourer is integral with the container.

FIG. 2 is a plan view of another embodiment in which the pourer provides closure also.

FIG. 3 is an elevational view, mostly in section, along 3—3 of FIG. 2.

FIG. 4 is an elevational view of another embodiment of the invention.

FIG. 5 is an elevational view, partly in section, of an embodiment of the invention in which the entire spout is movable without rotating one end thereof.

FIG. 6 is a perspective view of the embodiment illustrated in FIG. 5.

DESCRIPTION OF PREFERRED EMBODIMENTS

In a preferred embodiment, the pourer is comprised of a spout having one end fixed to a supporting structure and having a pouring end rotatable from a pouring position outside the container to a reposing position such that any liquid thereon will drip into the liquid within the container. Ordinarily, the supporting structure is a top integral with the container or fixed thereto in an appropriate manner such as by threaded connection. To best effect the dripping of the liquid back into the liquid within the container, the spout should be inclined in normal repose. In fact, the spout must be inclined more than 15 degrees with the horizontal to effect dripping of viscous liquids, such as syrup, in cold weather. Preferably the spout is inclined at least 30 degrees with the horizontal.

For satisfactory operation, the spout must have sides which form in conjunction with the container, or top, a liquid impermeable path when the spout is in the pouring position.

In a simple embodiment of the invention such as shown in FIG. 1 pouring spout 10 may be made integrally with the container 12. Rigid pouring portion 14 has a pouring end 15 which is rotatable about a fulcrum end 16 into pouring position as shown. Follower sides 18 define a liquid impermeable path which constrains the liquid to flow over the rigid pouring portion of the spout. Knurled knob 20 provides positioning means for rotating the rigid pouring portion into pouring position or into reposing position, as shown by the dotted lines.

The pourer is constructed of the materials ordinarily employed with the liquid to be poured. For example, container 12 may be glass, ceramic, metal or plastic such as polyethylene or polypropylene. Spout 10, likewise may be metal or plastic. Ordinarily, in the embodiment illustrated in FIG. 1, follower sides 18 are of plastic, such as flexible polyethylene or polypropylene. Rigid pouring portion 14 is of a relatively non-flexing material such as a metal or solid polypropylene. Knurled knob 20 and its shaft are preferably of non-corroding yet durable, material such as stainless steel or nylon.

Once the idea of a pouring spout having a pouring position outside a container and a reposing position inside a container so the liquid drips within the container is obtained, many structures come readily to mind to bring about the desired result.

One such structure or embodiment is illustrated in FIGS. 2 and 3. Therein a screw-on cap 22 serves as a supporting structure for spout 24. Spout 24 is rotated about fulcrum end 26 into pouring position shown by dotted lines. Follower sides 28 slide adjacent each other and form liquid impermeable walls along a path which constrains the liquid to flow out the spout when it is in the pouring position. Positioning means comprise circular gear 30 fixed to rigid portion 32 of spout 24, and caused to rotate by lineal toothed member 34 held contiguous to gear 30 by idler 36. Lineal toothed member 34 is given motive power by manually operable hammer 38. As hammer 38 is depressed, lineal toothed member 34 is moved, causing the spout 24 to rotate into pouring position. An optional closure is illustrated in FIGS. 2 and 3 also. As hammer 38 is initially depressed, catch 40 engages toggle 41 on closure 42, pulling it back to the edge 44 of top 22, before the spout passes. Closure 42 is held in alignment by the guides 45.

When hammer 38 is released, spring 47 returns it to normal repose. Spout 24 is also returned to normal repose. During the return, catch 40 pushes, via toggle 41 closure 42 into closed position.

Another embodiment in which a hammer 48 having a toothed arcuate extension 49 replaces hammer 38 and lineal toothed member 34 as a part of positioning means, is illustrated in FIG. 4. Otherwise spout 24 therein is rotated into and out of pouring position as described in connection with FIGS. 2 and 3.

FIGS. 5 and 6 illustrate another embodiment in which spout 50 normally reposes at an angle within the container 52 so that any liquid thereon will drip back into the liquid within the container. Spout 50 is movable, without rotation, to a pouring position with one end outside the container. The other end moves up to and conformably abuts the top in liquid impermeable relationship. A sealing flange may be provided on the spout to fit against the top. Preferably, a dish shaped sealing flange 54 is provided to abut a dish shaped depression 56 in the top. Dish shaped depression 56 acts as a swab to remove liquid from the spout as it moves therethrough. Spout 50 may be cut at an angle at the top to allow any liquid that may accumulate in the dish shaped depression to drip back into the container.

Positioning means comprises two key guides 59, one on either side of the spout 50, slidable upward through key way slots 60. If desired, the guides may be fastened at the bottom and allow slight movement of the top end to seat the spout by moving notch 61 onto top of slots 60. Ordinarily this is not necessary since the spout will remain in pouring position by friction and must be manually returned to normal repose.

Further, closure 62 may be provided. As shown closure 62 is simply a cover returned to closed position by spring 64. Spring 64 is ordinarily a light spring. Otherwise, it will move spout 50 away from the pouring position.

Other embodiments employing mechanical equivalents may be employed. Other mechanical equivalents may be substituted for the apparatus shown and illustrated herein. The detailed description and accompanying drawing are given by way of illustration, and not in limitation. The scope of the invention is defined in the appended claims.

I claim:
1. A pourer for pouring a liquid from a container comprising:
   a detachable cap defining a liquid-impermeable supporting structure;
   a spout supported in said detachable cap by positioning means, having a fulcrum end pivotally affixed to said cap and having a pouring end rotatable into a pouring position outside said container, having follower sides sliding adjacent each other and forming liquid-impermeable walls along a path constraining said liquid to flow out said spout when said spout is rotated into said pouring position and rotating back into the interior of said cap with said spout; said spout being at normal repose within said container with said pouring end lower than said fulcrum end; and said positioning means operable to rotate said spout to said pouring position and to rotate said spout back into a position of normal repose.

2. The pourer of claim 1 in which said positioning means comprises a circular gear affixed to said fulcrum end of said spout, a toothed member held adjacent said circular gear and movable to rotate said circular gear, a hammer pivotally attached to said cap at a fulcrum point and connected with said toothed member so as to cause movement thereof when said hammer is depressed or returned to a normal reposing position.

3. The pourer of claim 2 wherein closure is provided to cover the opening in said cap when said spout is returned to normal reposing position within said container.

4. The pourer of claim 2 wherein said toothed member is lineal and is connected with said hammer means by a flexible connection.

5. The pourer of claim 2 wherein said toothed member is arcuate and is integrally connected with said hammer means.

References Cited

UNITED STATES PATENTS

| | | | |
|---|---|---|---|
| 1,232,930 | 7/1917 | Kennedy | 222—110 |
| 1,687,316 | 10/1928 | Rollason | 222—535 X |
| 2,072,756 | 3/1927 | Kosa | 222—535 |
| 1,768,098 | 5/1930 | Aulbach | 222—109 |
| 2,263,783 | 11/1941 | Langenstein | 222—535 X |
| 2,455,769 | 12/1948 | Hermani | 222—534 X |
| 3,081,921 | 3/1963 | Pierro et al. | 222—525 |

FOREIGN PATENTS

| | | |
|---|---|---|
| 405,013 | 1/1934 | Great Britain. |
| 413,005 | 9/1924 | Germany. |

ROBERT B. REEVES, Primary Examiner

H. S. LANE, Assistant Examiner

U.S. Cl. X.R.

222—505, 531